United States Patent

Longhi

[15] 3,677,055
[45] July 18, 1972

[54] APPARATUS FOR MAKING SHAPED BORES IN A CONTINUOUS STRIP

[72] Inventor: Giuseppe Longhi, Via Volturno N° 5, Bergamo, Italy

[22] Filed: Feb. 1, 1971

[21] Appl. No.: 111,499

[30] Foreign Application Priority Data

April 29, 1970 Italy ................................... 2918 A/70

[52] U.S. Cl. ................................................. 72/326, 72/421
[51] Int. Cl. .................................................. B21d 31/02
[58] Field of Search ........................... 72/325, 326, 327, 332

[56] References Cited

UNITED STATES PATENTS 2,613,743  10/1952  Bangerter ........................... 72/326 X

*Primary Examiner*—Charles W. Lanham
*Assistant Examiner*—R. M. Rogers
*Attorney*—Richard P. Alberi

[57] ABSTRACT

Apparatus for making shaped bores in a metal strip, comprising a base and a vertically alternating press, said strip being blockable therebetween. The base carries a cutting profile bar and the press carries a blade, the lower edge of which is tooth-shaped with a rather substantial thickness. During press downward movement, the blade cooperating with said bar, first shears off a series of separate aligned cuts in the strip and then the bar is moved away from the blade which, continuing its downward movement will deform by its teeth and stretch out the strip at said cuts. As the press along with the blade moves upwards, said bar moves back to operative position and urges the metal strip forward by one step.

4 Claims, 8 Drawing Figures

INVENTOR.
GIUSEPPE LONGHI

INVENTOR.
GIUSEPPE LONGHI

INVENTOR.
GIUSEPPE LONGHI

APPARATUS FOR MAKING SHAPED BORES IN A CONTINUOUS STRIP

This invention relates to an apparatus for making shaped bores in a continuous strip and more particularly shaped bores in a continuous metal strip by cutting and stretching the strip.

Strips or plates, particularly of metal material, having shaped bores are used in a great deal of applications.

According to the most commonly followed technique, bores in strips or plates are provided by passing the strips under a press having punches shearing off from the strips portions of material falling away as scraps and leaving corresponding bores in the strips.

The main disadvantage in this method for providing bores in strips or plates consists of the substantial waste due to the above mentioned scraps.

It is the primary object of the present invention to provide an apparatus by which shaped bores can be continuously made in strips or plates, particularly of metal material, without any scrap losses.

A further object is to provide an apparatus of the above character, wherein the strip or plate being bored undergoes a longitudinal stretch.

These and still other objects are all accomplished by an apparatus comprising a base having an upper surface whereon a continuous strip is carried and slidable, means for drawing the strip from the base, a rigid bar carried by said base and having a sharp free edge on which said strip abuts and facing said strip drawing means, a blade having a lower cutting edge, powered members for reciprocating said blade in a direction substantially at right angles to said upper base surface and at the sharp free edge of said bar, and a plate carried by said members pressing the plate on said upper base surface as the blade moves downwards and lifting the plate away from said upper surface as the blade moves upwards, the apparatus being characterized in that said cutting edge of the blade is shaped with a plurality of teeth having a somewhat enlarged thickness, said rigid bar is fast with at least one piston, carried on and movable within a corresponding seat in the base, shaped rigid elements are provided and connected to said blade and members, said piston abutting and being urged thereon, the sharp free edge of said bar being kept substantially coplanar with the adjacent tooth-shaped lower cutting edge of the blade under the conditions where, as a maximum, only a limited portion of said tooth-shaped cutting edge of the blade is positioned below the sharp free edge of the bar, said shaped elements having an inclined surface contacted by said bar which is urged away from the blade, said piston being retracted within its seat under the conditions where a larger portion of the blade tooth-shaped edge than the above mentioned portion is positioned below the sharp free edge of the bar.

For a more clear understanding of the structure and features of the apparatus, an embodiment thereof will now be described by mere way of not limiting example, reference being had to the accompanying drawings in which.

Figure 1:
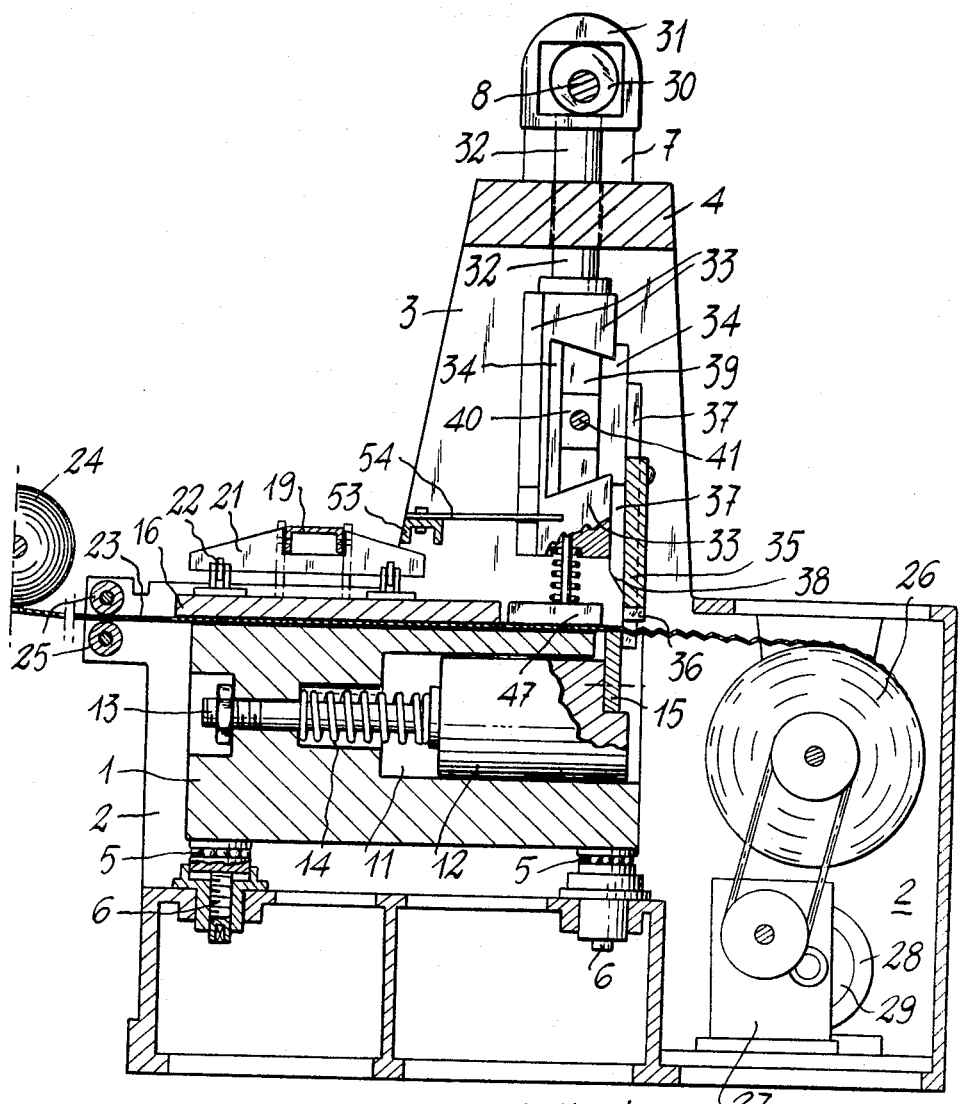
FIG. 1 is a schematic longitudinal sectional view of the apparatus.
Figure 2:
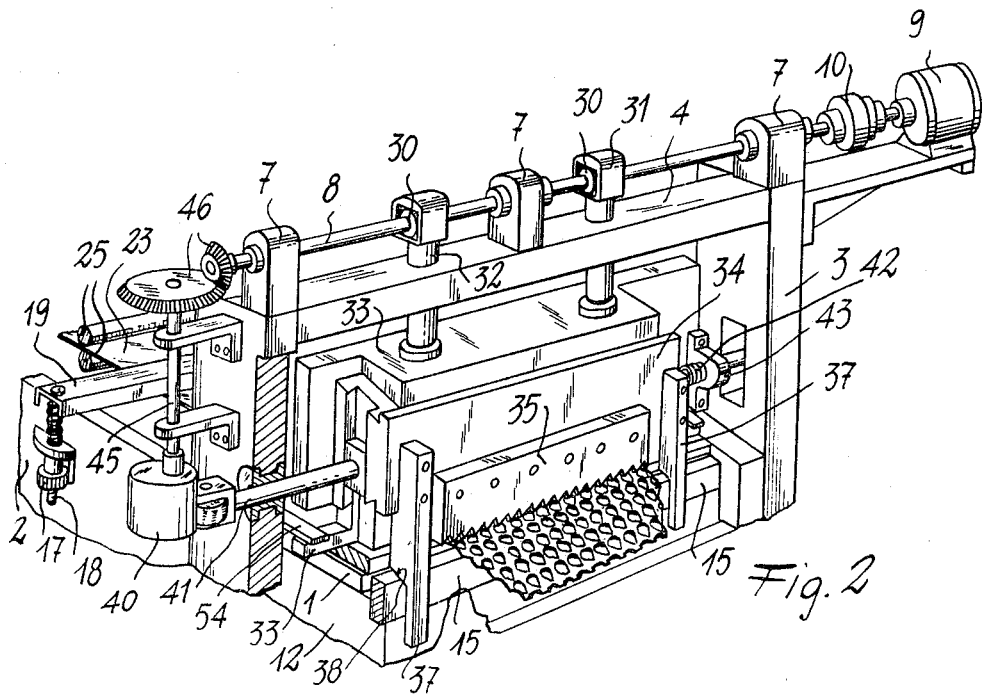
FIG. 2 is a fragmentary perspective view of the apparatus, as seen from the front portion thereof.
Figure 3:
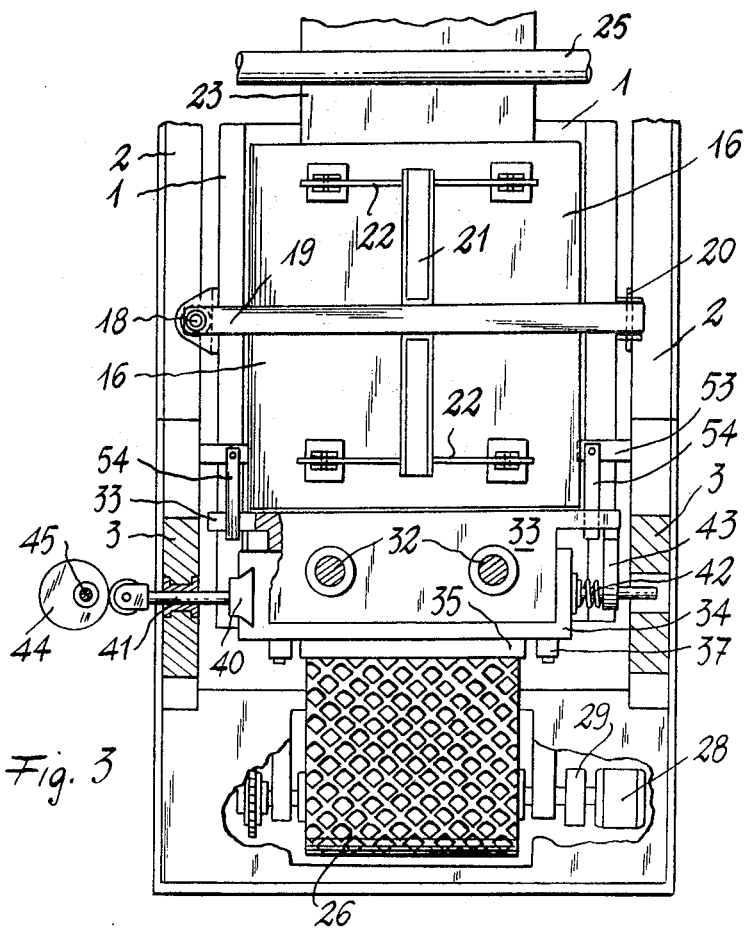
FIG. 3 is a plan and partly sectional view of the apparatus.
Figure 4:
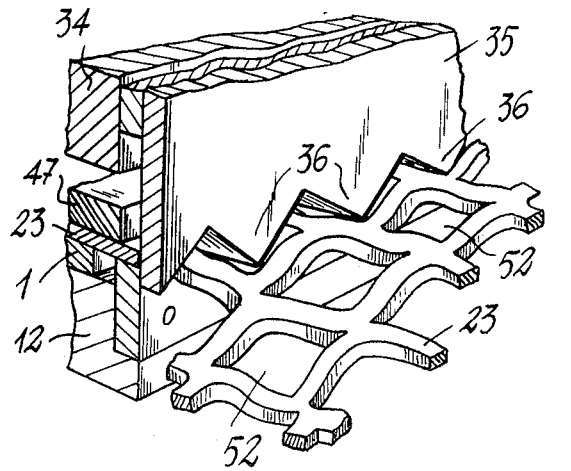
FIG. 4 is an enlarged perspective view showing a detail of the apparatus.

As particularly seen in FIGS. 1, 2 and 3, the apparatus comprises a rigid base 1 having sides 2, two uprights 3 connected by a bar 4 extending upward therefrom. The base 1 is mounted on ball bearings 5 (FIG. 1) carried by screws 6, the rotation of which causes the upper flat surface of base 1 to take a perfectly horizontal attitude.

Extensions 7 project from the uprights 3 and bar or cross piece 4, carrying and allowing the free rotation of a rigid shaft 8 rotably driven by an electric motor 9 through a joint 10.

At least one cylindrical seat 11 is provided in the base 1, each of the seats movably accomodating a piston 12 which is fast with a stem 13 and biased to move out of said seat by a spring 14, of which one end abuts on the base and the other end abuts directly on piston 12. A portion of piston 12 projects out of its seat in the base and a rigid bar 15 is attached thereto, the upper surface of this bar being coplanar with the upper free surface of the base and the outwardly facing free edge of which has a sharp cutting profile.

A rigid plate 16 is provided above the free surface of base 1 and pressed towards the base by a force which can be adjusted through a nut 17 (FIG. 2) screwable on the stem of a screw 18 mounted on one end of a cross rod 19, the other end of which is rotably mounted on a horizontal pin 20, this rod 19 urging on a rigid arm 21 which, in turn, bears on two cross arms 22 abutting directly on plate 16.

Between the opposing surfaces of base 1 and plate 16, a portion of a strip 23, preferably of metal material, is located and movable, such as from a reel 24 (FIG. 1) and passing between two elongated parallel rollers 25, the latter being freely rotable about the axes thereof; after passing over the bar 15, the strip 23 is collected on a reel 26 rotated about its own axis, through driving gears and a speed reducing unit 27, by an electric motor 28 operating on the speed reducing unit through a clutch 29 capable of slipping without being damaged, such as an electromagnetic joint, a powder or a hydraulic converter. Thus, even though the rotation of reel 26 is prevented, the motor 28 can continue to rotate without damaging the clutch 29 and yet still exerting an action on the reel continuously maintaining under tension that portion of strip 23 which is between it and the machine base.

Cams 30 are mounted on the rigid shaft 8 and housed within elongate holes in bushings 31 fast with rods 32 which are movably accomodated within holes on the cross piece 4, so that the rotation of cams 30 due to the rotation of shaft 8 causes a continuous alternate upward and downward movement for rods 32.

A large-sized rigid body 33 is fast with the lower end of rods 32, a horizontal dovetail slot being formed therein (FIG. 1), in which a body 34 is movably accomodated and horizontally movable relative to body 33 in the guideway formed therein.

A blade 35 is attached to the body 34 and its lower edge has a sharp profile shaped with a plurality of teeth 36 of a somewhat enlarged thickness. Two shaped rigid elements 37 are also made fast with the body 34 and blade 35, these elements 37 downward extending and having at the lower end thereof a substantially vertical flat surface against which said bar 15 abuts, as urged by spring 14, under the conditions where the blade 37 is lifted away from strip 23, as described below. The shaped elements 37 have also an inclined plane surface 38 which, when the blade 35 is at full lowered position relative to the base, abuts the bar 15 causing the retraction of said bar and piston 12 within its seat 11 against the action of spring 14.

Finally, a vertical dovetail slot 39 is formed in body 34 and accomodates a sliding block 40 fast with a rod 41, the sliding block 40 being guided and axially movable within a bushing attached to one of the uprights 3, as particularly shown in FIGS. 2 and 3.

One end of body 34 is acted upon by a spring 42, the other end of which acts upon an extension 43 integral with body 33; the spring 42 acts upon body 34 to urge it to the left as seen in FIGS. 2 and 3, i.e. to hold a roller, freely rotably mounted on the free end of rod 41, pressed on the surface of a camm 44 which is mounted on a spindle 45 rotated by shaft 8 through a pair of bevel gears 46 (FIG. 2), so that the spindle 45 will complete one revolution about its own axis every two revolutions of the shaft 8.

Figures 5, 6:
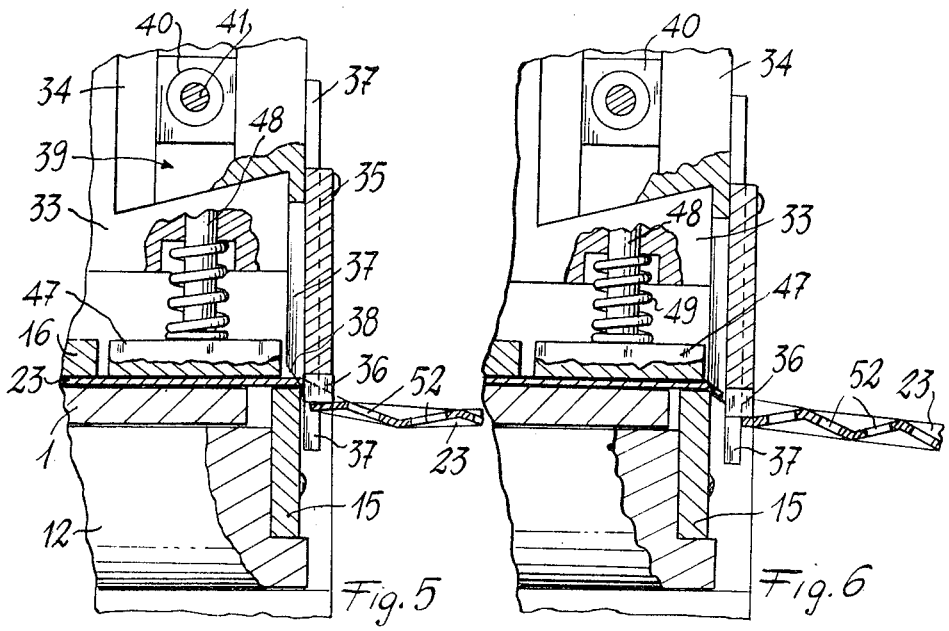
FIGS. 5 and 6 are two details at distinct operative steps of the apparatus which is shown in a partly sectional view.

At the bottom of body 33 an elongate rigid plate 47 is provided and bears on plate 16 and is connected to body 33 by vertical shafts 48 which are movably housed within bores in said body 33, a spring 49 being coiled on each of the shafts 48, as particularly shown in FIGS. 5 and 6.

Assume now that the apparatus is at the conditions as shown in FIG. 1, where the blade 35 along with the bodies 33 and 34 are upward lifted by the cam 30 acting upon the bushing 31: under these conditions the plate 47 merely bears on plate 16, whereas bar 15 is urged against the lower end of elements 37 and plate 16 exerts such a pressure on strip 23 as to prevent the strip from being fed by operation of motor 28, the strip being yet tensioned by motor 28 through the slipping clutch 29.

Suppose that motor 9 is operating and shaft 8 rotates about its own axis and accordingly cam 30 also rotates downward urging the bodies 33 and 34, shaped elements 37 and blade 35. At a first step of this downward movement, the plate 47 is increasingly forcibly pressed on plate 16 so as to firmly clamp the strip 23 on base 1, while the sliding block 40 is stationary relative to the fixed frame of the machine and slides within the slot 39 of body 34.

At a given time, as said downward movement continues, the teeth 36 of blade 35 will contact the surface of strip 23, the sharp profile of the blade teeth skimming the sharp free edge of bar 15: at this blade descent step, rectilinear cuts 50 are made in strip 23, which cuts are parallel to the sharp edge of bar 15 and the length of which depends on the downward displacement of teeth 36 relative to the sharp free edge of the bar. Downstream of cut 50, the strip 23 is slightly downward bent by said teeth 36 having a somewhat increased thickness, as particularly shown in FIG. 7 which is a plan view showing a portion of strip 23 at the described step, corresponding to that shown in FIG. 5.

As the downward movement further continues for the bodies 33 and 34 along with blade 35 and shaped elements 37, which are positioned laterally of the strip so as not to interfer therewith, the inclined plane surfaces 38 of elements 37 will react on bar 15 moving it away from the blade together with the piston 12 against the springs 14 to reach the position as shown in FIG. 6. It is apparent that, as soon as the bar 15 has been moved away from blade 35 the latter, continuing its downward movement relative to base 1, is no more capable of cutting off the strip, but the peak of each of the blade teeth 36 acts upon the material of the strip (which upstream of the blade is clamped between the base 1 and plate 16) buckling and stretching the material so as to cause each of the cuts 50 to take the shape of a bore 51, such as those shown in FIG. 8, wherein the same portion is shown for strip 23 as in FIG. 7, but after the blade 35 has reached the lower end of its downward stroke, at which conditions the apparatus is as shown in FIG. 6.

Figures 7, 8:
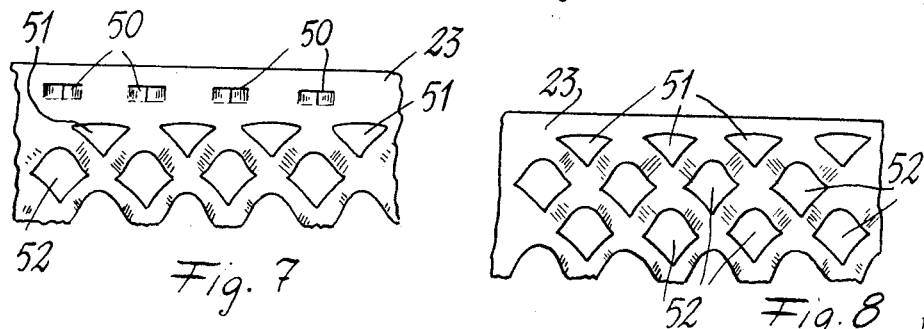
FIGS. 7 and 8 are top views showing two portions of metal strip at two successive processing steps by the apparatus for making shaped bores therein.

Now, as the shaft 8 continues to rotate, the cam 30 upward lifts the bodies 33 and 34, blade 35 and shaped elements 37, the inclined plane surface 38 of which slides away from bar 15 which, under the bias of springs 14, moves to the right, as seen in FIG. 6, and exerts a forward bias on the strip which, added to the traction exerted on the strip by motor 28 through clutch 29, causes said strip to be fed by a predetermined length, corresponding to the path travelled by the bar 15 to move from the position of FIG. 6 to that of FIG. 7, where it abuts against the vertical lower extension of element 37, the movement of the strip relative to the base being allowed because of no pressure being exerted by plate 47 on plate 16, the pressure effect of which is, in turn, insufficient to hold the strip stationary against the combined tractive force exerted by bar 15 and motor 28.

During said upward movement, the sliding block 40 slides within the slot 39 and shaft 8, rotating through 360°, causes a rotation through 180° for the spindle 45 and hence for the cam 30, the latter acting upon the roller carried by rod 41 providing a rightward side displacement (as seen in FIGS. 2 and 3) of body 34 relative to body 33, so that, when bodies 33 and 34 descent again to repeat the above described cutting and stretching step of the metal strip, said teeth 36 are sidewise displaced relative to the position thereof at the preceding downward movement on the strip. At this second strip buckling and cutting step, upstream of the above mentioned bores 51, there are firstly formed new cuts 50 and that portion of the strip which is adjacent the blade will take the shape as shown in FIG. 7. As the downward movement of the blade continues, also these new cuts 50 are buckled to take a substantially triangular shape 51 and the former bores, originally triangular bores, are buckled to take the shape of substantially quadrangular bores 52 (FIG. 8), and this because the metal strip is firmly held stationary on the base, while the peaks of teeth 36 buckle and stretch the material of the strip particularly downstream of bar 15.

Ultimately, the cycle is repeated by upward and downward movements of the blade, which at each cycle alternately moves to the right and to the left relative to the base and all of the bores made in the strip have a substantially quadrangular shape as those shown in FIGS. 7 and 8, except for the row of bores which is closer to bar 15, wherein the bores have a substantially triangular shape.

Thus, as apparent, a sequence of evenly distributed bores are made in the metal strip, the shape of the bores depending on that of teeth 36 and movement thereof relative to bar 15, and it is important to note that said bores are provided in the strip or plate without any scraps, that is without any loss of material, while the stretched strip or plate has very high mechanical characteristics.

The side movement of body 34 and blade 35 therewith relative to body 33 and strip 23 is not essentially necessary, because in the apparatus said blade could only upward and downward move, however in this case all of the bores in the metal strip would be aligned and parallel to one another and generally have a substantially triangular shape as that of the bores 51 in FIGS. 7 and 8.

Since the displacement movement of bodies 33 and 34 in a vertical direction may have a very high frequency, and in order to dampen any deleterious vibrations which in some cases may occur, it has been found advantageous that said uprights 3 have brackets 53 attached thereto, on which leaf springs 54 are secured and inserted in widened slots at the side edges and adjacent the lower end of body 33, as particularly shown in FIG. 2.

From the foregoing it will be readily understood that by means of the described apparatus it is possible to provide in a ready simple manner and particularly at a somewhat lower cost over the conventional methods, strips and particularly metal strips having a plurality of shaped bores evenly distributed throughout the surface thereof.

What I claim is:

1. An apparatus for making shaped bores in a continuous metal strip by cutting and stretching the strip, comprising a base having an upper surface whereon a continuous strip is carried and slidable, means for drawing the strip from the base, a rigid bar carried by said base and having a sharp free edge on which said strip abuts and facing said strip drawing means, a blade having a lower cutting edge, powered members for reciprocating said blade in a direction substantially at right angles to said upper base surface and at the sharp free edge of said bar, and a plate carried and pressed by said members on said upper base surface as the blade moves downwards and being lifted by said member away from said upper surface as the blade moves upwards, wherein said cutting edge of the blade is shaped with a plurality of teeth having a somewhat increased thickness, said rigid bar being fast with at least one piston, carried on and movable within a cavity in the base, shaped rigid elements being provided and connected to said blade and members, said piston abutting and being urged against said rigid element, the sharp free edge of said bar being kept substantially coplanar with the adjacent tooth-shaped lower cutting edge of the blade under the conditions where, as a maximum, only a limited portion of said tooth-shaped cutting edge of the blade is positioned below the sharp free edge of the bar, said shaped elements having an inclined surface contacted by said bar which is urged away from the blade upon downward movement of said inclined surface, said piston being retracted within its seat under the conditions where a larger portion of the blade tooth-shaped edge than the above mentioned portion is positioned below the sharp free edge of the bar.

2. An apparatus according to claim 1, wherein said means for drawing the strip from the base comprise a reel for strip winding up and an electric motor connected to said reel to rotably drive it through a clutch slipping under the conditions where the cutting profile of said blade is adjacent the sharp edge of said bar.

3. An apparatus according to claim 2, wherein above said upper surface of the base a plate is located, between which and said surface said strip can be movably positioned, means acting thereon and urging said plate towards said surface.

4. An apparatus according to claim 3, wherein said blade is carried by said members through a slidable carriage connection within a substantially rectilinear guide at right angles to the reciprocating direction of said members, movable cams being provided and act upon the blade to cause it to move sidewise and then to move back to its original position relative to said members depending on the movement of said members.

* * * * *